Oct. 19, 1971   R. J. ROSE ET AL   3,613,277
APPARATUS FOR THE SEQUENTIAL AND SELECTIVE PROJECTION OF
GROUPS OF STRIPS OR THE LIKE AND CASETTES FOR THE
INSTALLATION OF THE STRIPS IN A HOUSING
Filed Jan. 27, 1969   10 Sheets-Sheet 1

INVENTORS
ROBERT J. ROSE
FRANK W. SANDERS
BY
Roberts & Cohen
ATTORNEYS

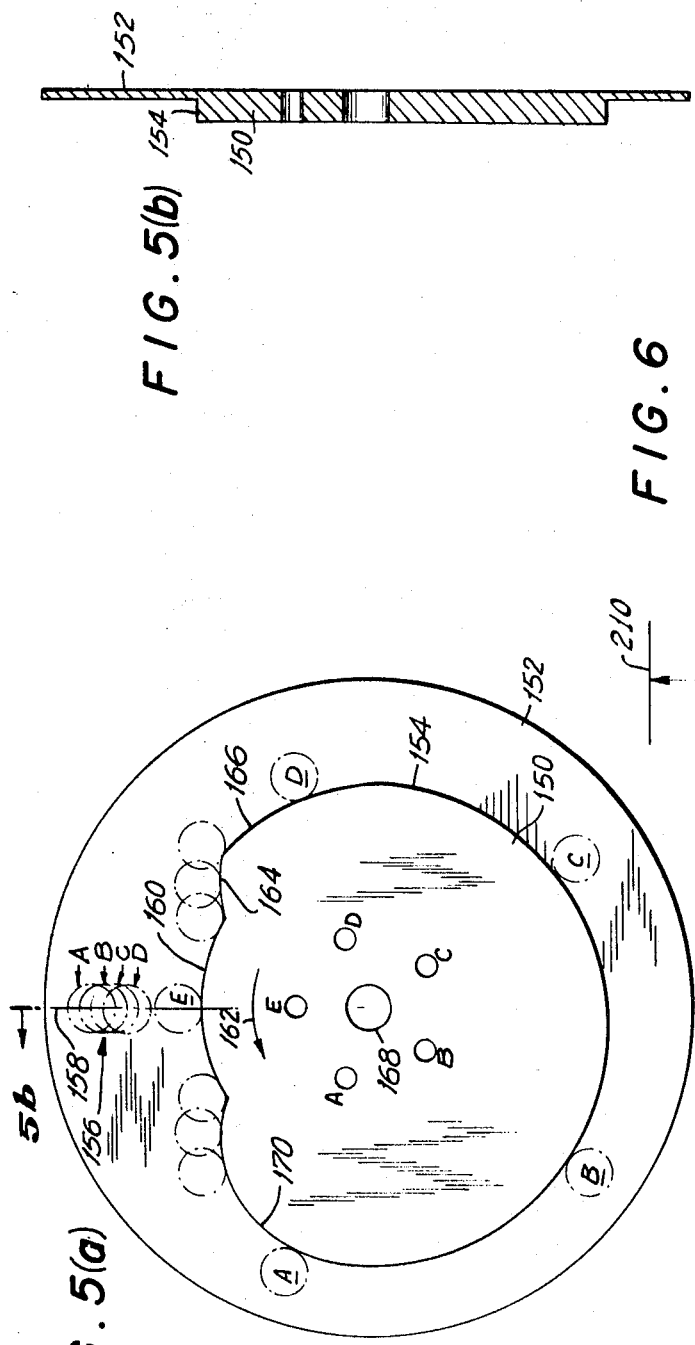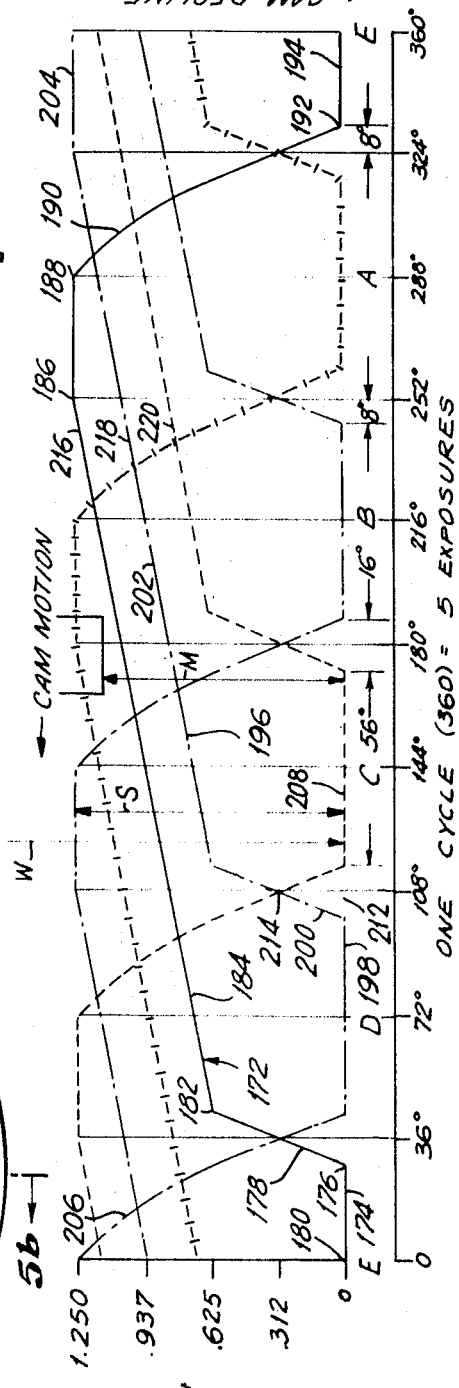

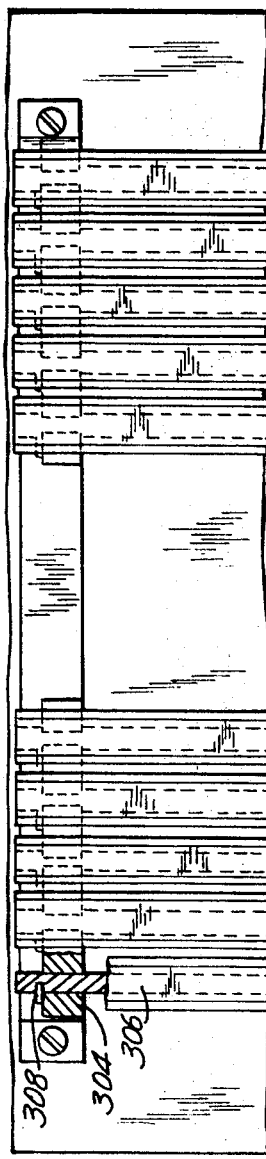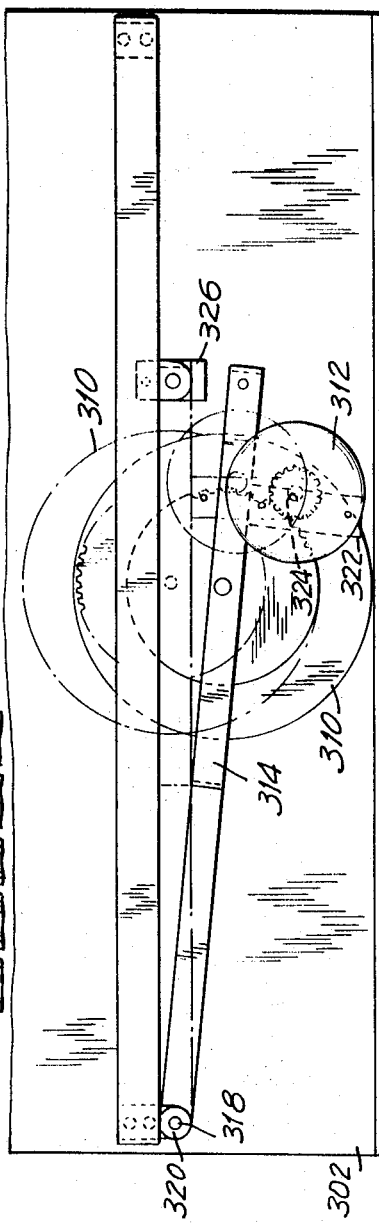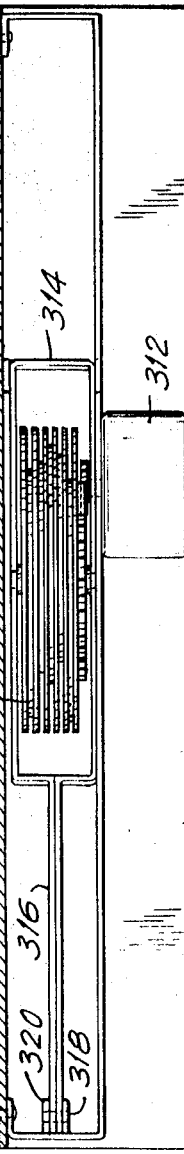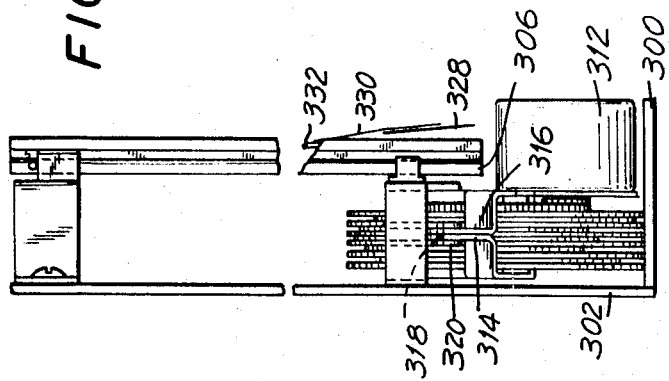

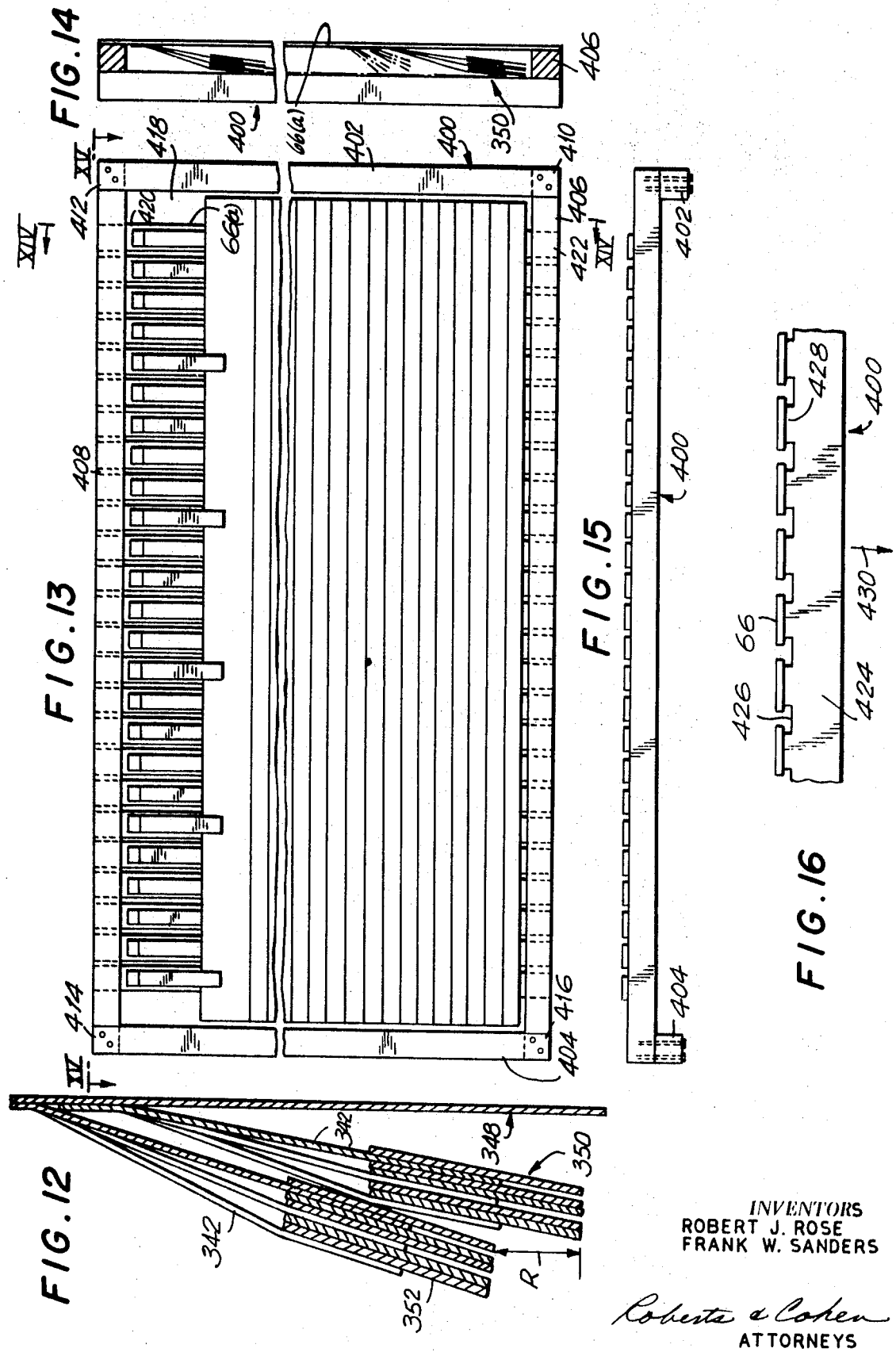

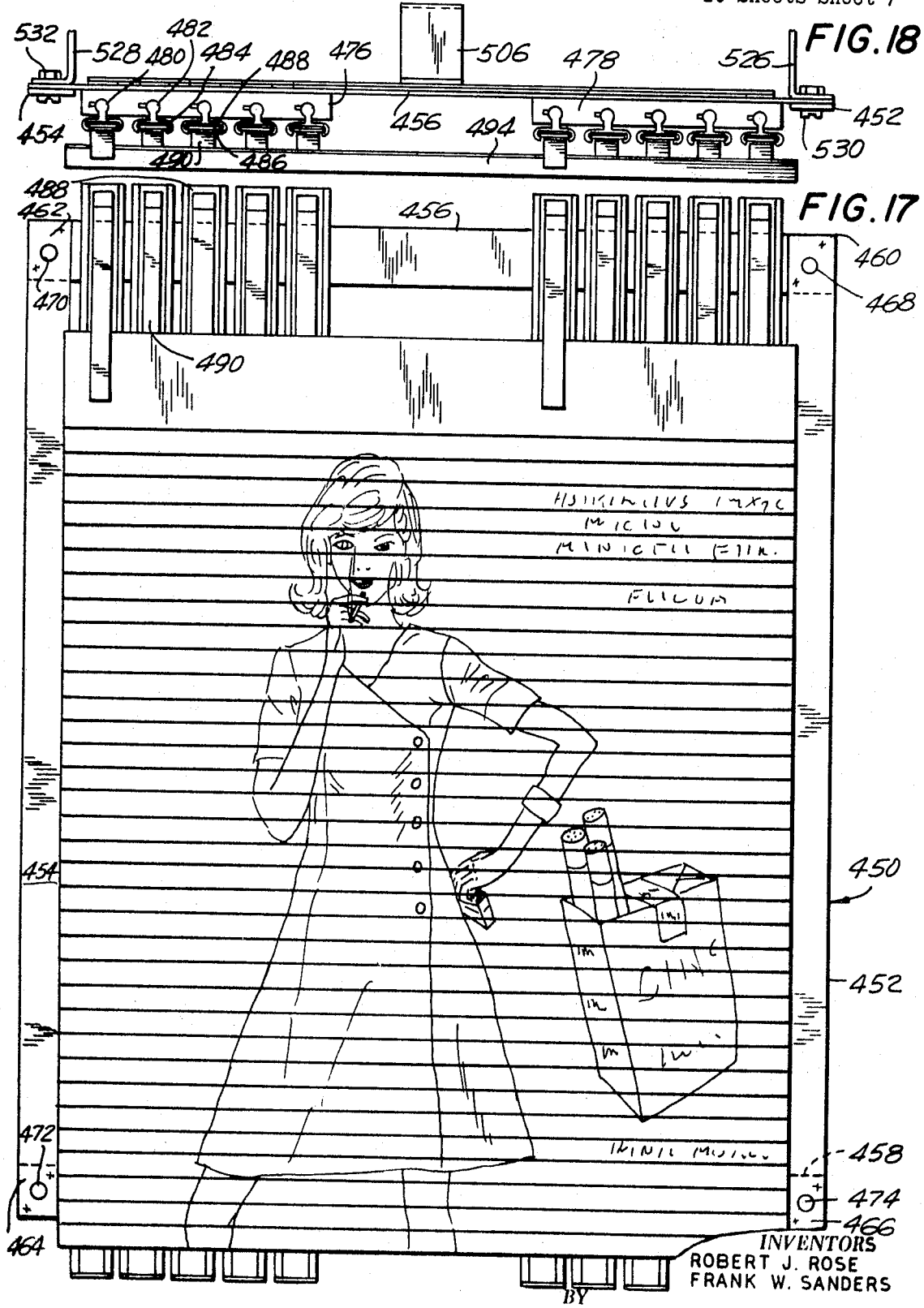

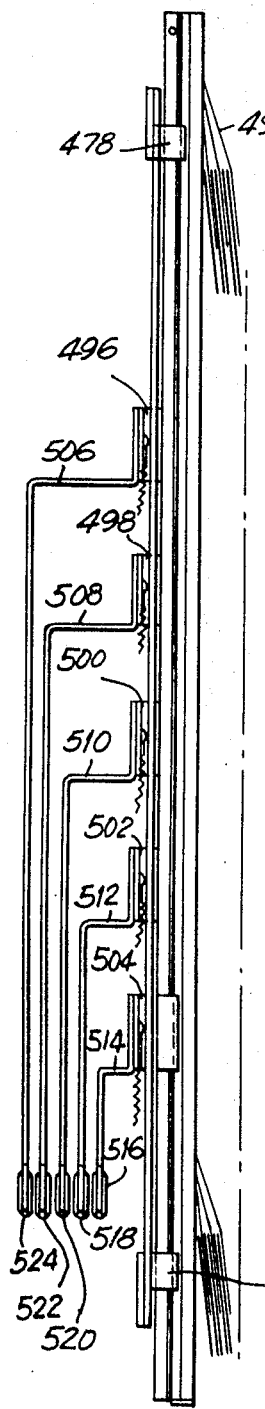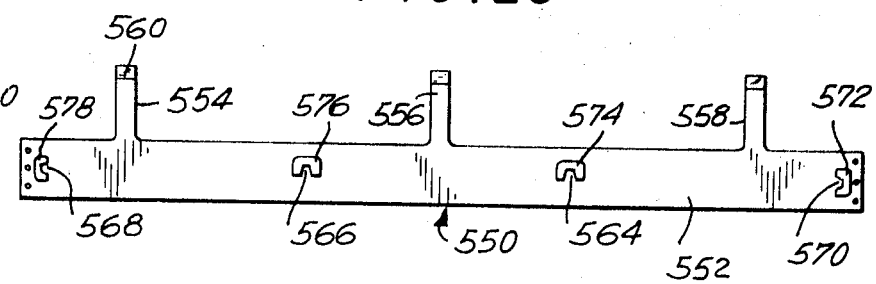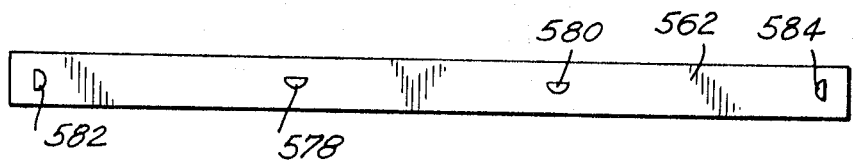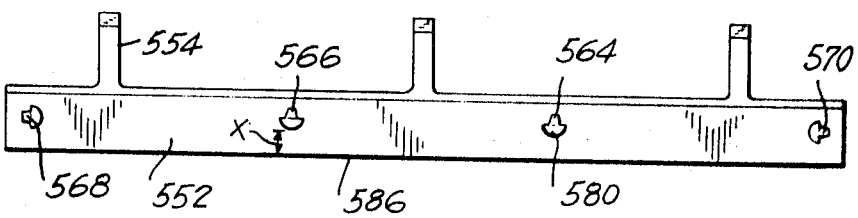

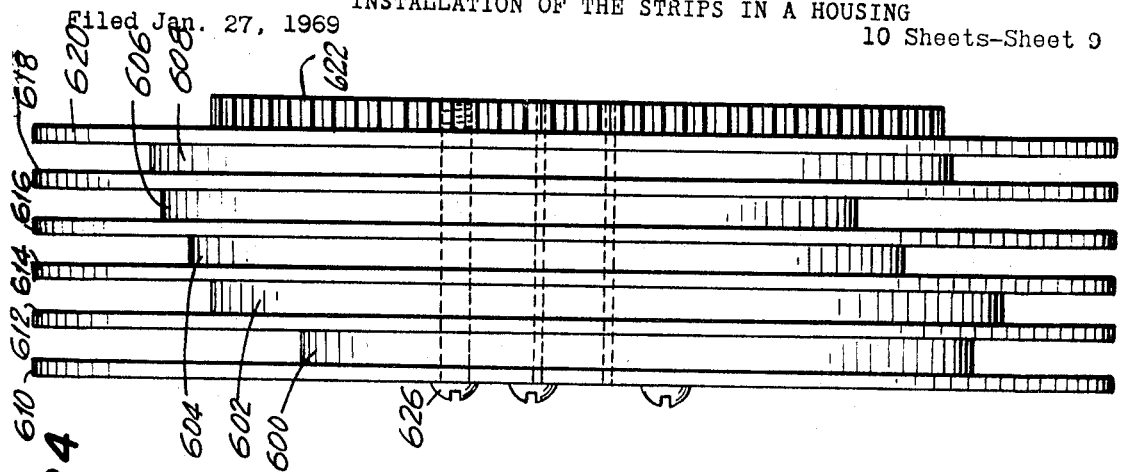
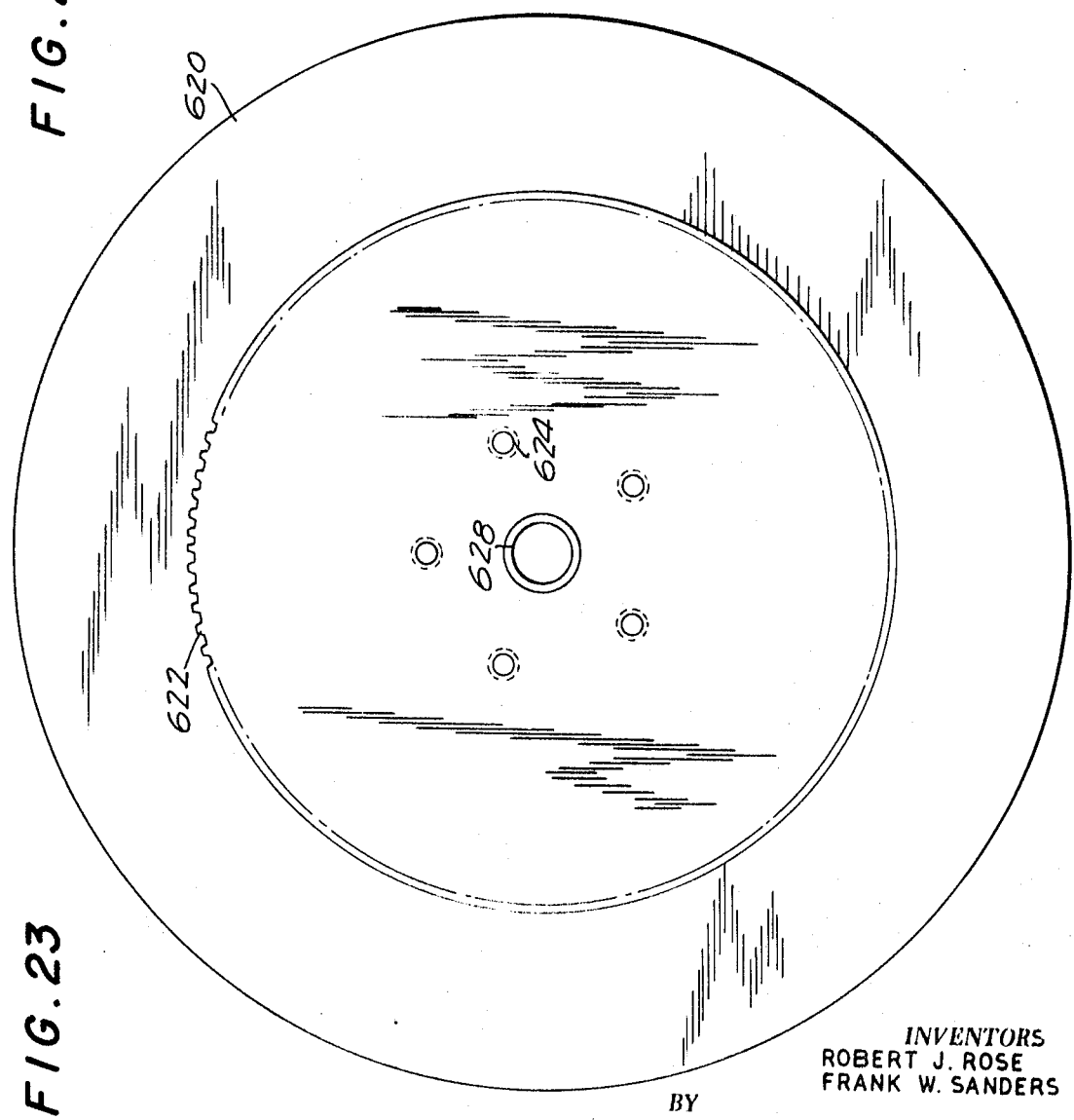

United States Patent Office 3,613,277
Patented Oct. 19, 1971

3,613,277
APPARATUS FOR THE SEQUENTIAL AND SELECTIVE PROJECTION OF GROUPS OF STRIPS OR THE LIKE AND CASSETTES FOR THE INSTALLATION OF THE STRIPS IN A HOUSING
Robert Joseph Rose, Los Angeles, and Frank Wilson Sanders, Topanga, Calif., assignors to Multimatic Displays, Inc., Great Neck, N.Y.
Filed Jan. 27, 1969, Ser. No. 794,309
Int. Cl. G09f 11/00
U.S. Cl. 40—65                                           24 Claims

ABSTRACT OF THE DISCLOSURE

A display device in which groups of strips constitute respective displays which are sequentially exhibited through a window in a casing. The strips are interleaved and, by groups, are projected to an extended position and removed to a withdrawn position. When all the strips of a group are in extended position, they are in overlapping relation with respective edge portions exposed as in a louvre arrangement. A motor operates at constant speed to drive a cam arrangement to control movement of the strips with a certain pattern of movement according to which all groups are displaced to and from the extended position. The strips are readily removable and several embodiments are shown with the strips in a casette arrangement.

BACKGROUND

This invention relates to apparatus suitable for displays, exhibits, advertising or educational purposes and the like, and more particularly to devices for the sequential and preferably cyclical exposure of intelligence constituting a series of displays or such which may be related to each other or not.

More specifically, the invention relates to improvements of a generally known type of apparatus in which a display or exhibit is constituted by a group of parallel interleaved strips arranged in overlapping relation in the manner of a louvre-like construction, there being a plurality of such groups which move through each other between withdrawn and extended positions in the latter of which one such group at a time can be visually inspected.

In such a device, due to the overlapping relationship of strips in a group, only selected edge portions of the strips are exposed, the remainder of the strips being behind and concealed by the next adjacent strips. For this reason, it is necessary for the portrayal, for example, of a scene to form the corresponding overlapping strips from a plurality of reproductions of such scene. The invention has, in part, a basis in this aspect of the construction as will be shown.

It is further to be noted that this invention is intended as an improvement over the construction disclosed in U.S. Pat. No. 2,978,822 which issued Apr. 11, 1961. In said construction, a permanent frame is employed to which one group of strips is permanently attached, the strips being stretched across the frame in upwardly inclined attitude. A second group of strips, which is to be viewed in alternation with the first group, is mounted in upwardly projecting relation on a board and these latter strips extend in interleaved relation through the strips of the first group. Whereas the first group is stationary, the second group is driven positively by a crank mechanism.

The mechanism and working of the aforesaid construction are useful. There are, however, important advantages which the invention provides with respect thereto. Such advantages will be indicated with particularity hereinafter.

The present invention also constitutes an improvement over the construction proposed in U.S. Pat. 2,829,456 which issued Apr. 8, 1958. This latter construction requires manual power which, of course, severely limits the application thereof. However, in addition, there are further distinctive characteristics such as the mounting of strips in upwardly projecting relation, the stacking of strips from different groups in piles during operation and so forth, with respect to which the invention provides significant improvement.

As to further prior art, the invention provides improvements with respect to Pat. No. 3,080,668, which issued Mar. 12, 1963. This patent, which relates to an advertising billboard employs a supporting framework from which the related strips protrude upwardly. This framework is driven with reciprocating movement by a ratchet and pawl arrangement which is in turn connected with the framework through a lever arrangement. As will be seen, the construction of the present invention possesses numerous advantages with respect to this latter type of construction.

Still further, the invention has numerous advantages with respect to U.S. Pat. No. 3,013,352 which, similar to the patents previously discussed, carries its strips in upwardly projecting relationship and, moreover, employs a lever-type drive which is inferior to the type of mechanism employed in the present invention.

SUMMARY OF INVENTION

It is generally an object of the invention to provide an improved apparatus for selectively projecting groups of strips or the like which are supported in interleaved arrangement.

It is a further object of the invention to provide an improved display device or the like constructed along the lines generally indicated above which requires minimum maintenance and is insured, insofar as is possible, against the likelihood of failure during extended periods of use.

A further object of the invention is to provide an improved construction of the aforenoted type which employs a minimum of parts, thus assuring economy in construction both as regards material and labor.

Yet another object of the invention is to provide an improved display construction of the above-noted type wherein noise from driving and driven parts is minimized.

It has been mentioned hereinabove that for a given display it is necessary to employ a plurality of reproductions for the same display. With respect thereto, it is an object of the invention to provide a construction wherein the number of such reproductions is minimized.

It will be understood from what has been set forth hereinabove that display devices of the invention are suitably used for purposes of advertising.

With respect to advertising, it will be readily appreciated that there is generally a need for replacing advertisements to substitute therefor other advertisements or perhaps to exchange material which is being exhibited for other material which is, for example, more current. In constructions heretofore available, the substitution of one display for another has been a task of substantial magnitude. It is an object of the invention, however, to facilitate the changing of displays by providing substitute displays in casette or cartridge form whereby a plurality of displays may be readily substituted without the involvement of substantial labor or difficulty.

Related to the above, it is an object of the invention to provide for facilitating the exchange of displays in the field. Thus, for example, it has heretofore been necessary, in cases where displays are utilized in areas other than whereat they were fabricated, to recall such displays for substitution purposes. This, of course, resulted in a lack of economy with respect to labor and with respect to which the invention provides improvement by facilitating the exchange of displays in the field.

One general difficulty to which displays of the heretofore known constructions were subject is that the strips in passing through and by each other were subjected to substantial deterioration. It is an object of the invention to minimize the deterioration to which such strips are subjected.

In achieving the above and other of the objectives of the invention, there is contemplated a construction involving the use of groups of strips which are selectively displaced between extended and withdrawn positions. With a group of strips being brought to extended position, the strips of this group are exposed. These exposed strips being in overlapping relationship, only the edge portions thereof are visible.

In accordance with the invention, the groups of strips are all movable between extended and withdrawn positions and preferably the use of one group of strips which is mounted in stationary position is avoided.

In further accordance with the invention, the strips employed are suspended in hanging relationship from an associated drive means, there being provided in such drive means a suitable control whereby the strips may be permitted some degree of free movement without harmfully coming into engagement with one another. In accordance with another aspect of the invention, the group of strips can be advantageously provided in casette or cartridge form whereby one set of groups of strips may be readily removed and replaced by another substitute set of groups.

In the preferred construction of the invention, a set of longitudinally displaceable and rigid elongated members are employed which are driven by cam elements and which in turn support the aforesaid strips. With these rigid elements, in accordance with the invention, are associated flexible supporting members which in turn support fingers from which the strips are suspended. The invention provides casettes which may on the one hand include the rigid supported elements or which on the other hand may exclude these rigid elements which may then become a permanent part of the display apparatus.

In either event, there is provided in accordance with one feature of the invention a particular construction of such rigid elements whereby they are constituted by separable sections which come apart to facilitate the insertion and installation of the flexible supports.

According to one aspect of the invention, there is thus proposed an apparatus comprising a plurality of groups of interleaved strips having extended and withdrawn positions, the strips of a group overlapping in louvre-like arrangement and when concomitantly in extended positions cooperatively exhibiting a display area constituted by exposed edge portions of the latter said strips, the apparatus further comprising a continuously operating cam arrangement and means between the cam arrangement and the groups of strips for cycling all of said groups between the extended and withdrawn positions thereof. Preferably in accordance with this aspect of the invention, the withdrawn positions of the different groups coincide and the extended positions of the groups coincide.

As will be shown in greater detail hereinafter, the cam arrangement of the invention preferably includes a cam element for each said group and there is associated with each such cam element a cam follower, a cross arm mounted on the cam follower, and at least one of the aforesaid rigid elongated elements attached to this cross arm and supporting the strips of one of the groups.

As will also be seen hereinafter, guide means are provided for guiding the elongated elements along respective and parallel vertical paths, the strips being held in horizontal attitude and thus being in transverse relationship to the elongated elements.

The guide means, as will be shown, may be constituted by monolithic bars or the like provided with socket openings accommodating the elongated elements. As an alternative, the guides may be constructed of a plurality of segments, which cooperatively may constitute a guide and at least some of which are provided with socket openings for accommodating the elongated elements.

The cam follower construction may advantageously be constituted by an inverted L-shaped device, there being a plurality of these which are mounted in nesting relationship.

One end of each of these constructions will support a roller which engages the corresponding cam element and the other leg will be connected to a substituted one of the aforesaid cross arms.

The above construction is, in accordance with the invention, accommodated in a housing comprising base, back and front sections. The front section is provided with a window through which the projected strips are visible. Advantageously, the front section is detachable from the base and back sections to provide ready access to the strips and to the driving elements associated therewith.

It will be noted in the detailed description which follows hereinafter that the invention proposes the use of a constant speed motor which continuously drives the cam arrangement so that a stepless type of movement results. This, it has been found, reduces wear and minimizes noise.

According to another aspect of the invention, a cam arrangement is provided such that only one group of strips at a time can occupy the extended position, while in the same arrangement it is moreover provided that only one group of strips at a given time can occupy the fully withdrawn position thereof.

As will be noted hereinafter, the cam arrangement provides a very important part of the preferred embodiment of the invention and it should be noted hereinafter with respect to the preferred embodiment that the strips are of a common width and that the withdrawn and extended positions are spaced apart at a distance which is less than said width. Thus the driving action effected through the cam elements is such that it will not cause the innermost edges of the strips to move past each other and this in turn will avoid snagging which might cause damage to the strips and effect the life and operation of the apparatus.

With further respect to the drive action effected through the aforesaid cam elements, it is to be noted as a feature of the invention that the groups of strips collectively occupy the extended positions continuously except for intervening periods of interchange which constitute less than about one-third of the time that the extended positions are occupied. This arrangement has been selected as a result of consideration of behavioral sciences since it has the effect of drawing the eyes of passers-by to the display with a greater magnetism than would a display in which there were no intervening periods.

It is furthermore to be noted that the edges of the strips moving into extended position pass by the edges of the strips moving away from extended position at a distance from the extended position which is about one-fourth of the first said distance. Still further, it is to be noted that the fingers supporting the strips include extremities on such strips which are spaced from the exposed edges of the strips by an amount which is less than the first aforesaid distance. This also contributes materially to reducing interengagement between the strips and the harm possibly caused thereto as a result.

The cam means of the invention operates to displace each group between withdrawn and extended positions in regularly repeating cycles. Such cycles include, in sequence, dwell in extended position, relatively rapid withdrawal from extended position partially towards withdrawn position, relatively slow completion of movement towards withdrawn position, dwell in withdrawn position, and relatively rapid return to extended position. The relatively rapid and slow movements from extended to withdrawn position each respectively accounts for approximately fifty percent of the distance through which movement is effected. As to movement from withdrawn to extended position, this preferably accounts for less than about one-eighth of the time of each cycle.

As a feature of the invention there is provided an arrangement whereby a plurality of groups of strips can move concomitantly from extended to withdrawn position with a regular spacing between the groups which is maintained constant. This results in a minimizing of friction between the strips and enhancing the reliability of the apparatus during extended operation.

There is also provided a preferred cam construction for the invention in accordance with which each cam element is separately formed, the elements having integral spacers and being held together with the spacers between the elements to provide a group of cam elements which are mutually adjustable yet sturdy in use and simple to fabricate and assemble.

The idea of a casette as noted above also constitutes an important aspect of the invention. The casette will generally be constituted by a support member, a plurality of groups of strips and connecting means detachably connecting the strips to the support such that the support is adapted for positioning the strips in a housing.

In conjunction with the use of a casette, the construction of the invention provides for a displaceable drive or control partly constituted by, for example, the aforesaid cam elements, whereby the drive can be moved out of interfering position for insertion of the casette and then moved back into position for operation.

As will be shown in greater detail hereinafter, when the drive is withdrawn the rigid elements supporting the strip will be brought to a mutually aligned position. With the rigid elements in aligned position, one type of casette provided by the invention provides for bringing flexible supports supporting the strips into engagement therewith. Thereafter, as will be shown, the bringing of the drive back to operative position will displace the rigid element into staggered relation therefore bringing about an appropriate distribution of the strips.

However, in accordance with yet another embodiment of the invention, there is provided a casette wherein the rigid elements themselves are part of the casette construction in which event the rigid elements are also replaced along with the associated strips.

As has been implied above, an important feature of a preferred embodiment of the invention involves suspending the strips in hanging relationship from the associated supports. This is achieved by the use of fingers or tabs connected to the strips. These fingers can be integral with the strips but preferably they are not. The reason for this is that, where the fingers are separate elements, the fingers and strips need not impose limitations on the physical characteristics of each other. These fingers may preferably be connected with flexible supports as has already been brought to attention. These flexible supports are in turn engaged and held in extended relationship by the aforenoted elongated and rigid elements. The use of a suspended relationship enables the use of strips which do not have any substantial degree of structural strength. These strips are not required to support each other as in previously known arrangements and their principal functions include merely that of carrying intelligence and being able to slip by one another with a minimum of friction and interference. The fingers have a preferred arrangement with respect to the strips as will be shown hereinafter. The arrangement is such as to minimize the packing volume required for the strips when embodied into a casette and also to minimize the presence of possibly snagging edges with respect to the operation of the device.

In accordance with a further feature of the invention, the strips may be mounted detachably on the strip carriers whereby it will be possible to readily detach the strips individually from the apparatus for purposes of replacement or repair. The particular construction by which this is effected will be described hereinafter.

The foregoing features and advantages of the invention as well as other objectives thereof will become apparent from the detailed description which follows hereinafter.

DRAWINGS

FIG. 5a is a front view of a cam element employed in the construction of FIGS. 2–4;

FIG. 5b is a diametral sectional view of the cam element of FIG. 5a;

FIG. 6 is a chart illustrating the relationship of the cam elements to each other and further showing the relationship of the strip edges throughout the cycling thereof;

FIG. 7 illustrates in front view corresponding to FIG. 2 an embodiment in which the drive mechanism is displaceable;

FIG. 8 is an end view of the lower portion of the construction illustrated in FIG. 7;

FIG. 9 is a top view of a portion of the apparatus illustrated in FIG. 8;

FIG. 12 is an end view of the strips of FIG. 11 illustrating how the same would be mounted on a support for purposes of being incorporated into a cassette;

FIG. 13 is a front plan view, partially broken away, of one type of cassette employed in accordance with the invention;

FIG. 14 is a partial diagrammatic sectional view of the cassette of FIG. 13 taken along line XIV—XIV;

FIG. 15 is a sectional view taken along line XV—XV of FIG. 13;

FIG. 16 shows a modification of the construction illustrated in FIG. 15, to provide accommodation for a particular receiving element in the display apparatus;

FIG. 17 is a front view of a second type of cassette provided in accordance with the invention;

FIG. 18 is a top view of the apparatus illustrated in FIG. 17;

FIG. 19 is a side view of the apparatus illustrated in FIG. 17;

FIG. 20 is a front plan view of a support which provides support for individual strips in another embodiment of the invention;

FIG. 21 is a front plan view of a strip which is to be used with the construction of FIG. 20;

FIG. 22 shows the combined strip and strip support as illustrated in FIGS. 20 and 21;

FIG. 23 is a side view of a drive element for driving the cam elements in the aforenoted embodiments;

FIG. 24 is a sub-assembly view from the edge of a cam assembly into which the driving element of FIG. 23 has been incorporated;

DETAILED DESCRIPTION

Figure 1:
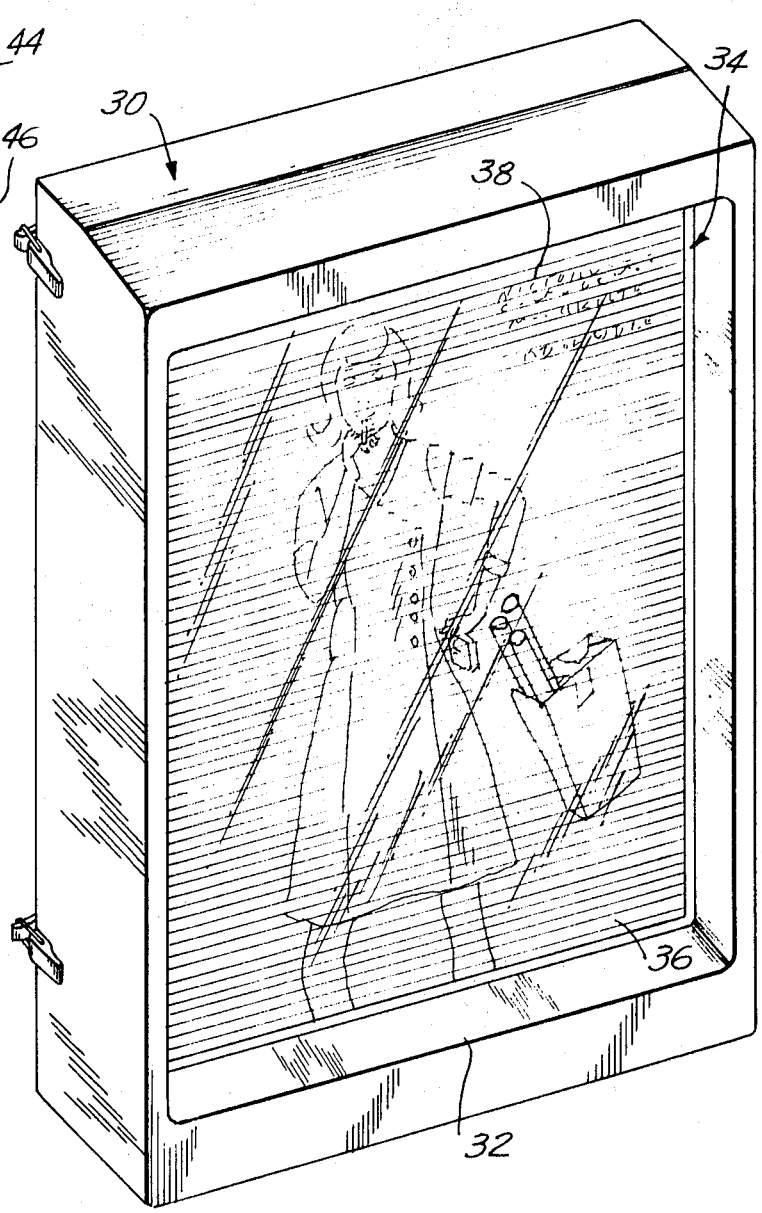
FIG. 1 is a perspective view of a display device provided in accordance with the invention.

FIG. 1 illustrates a generalized version of a display apparatus 30 provided in accordance with the invention. It will be readily understood from the description which follows hereinafter that the shape of such apparatus may vary widely while nevertheless employing the various features of the invention.

Generally, the apparatus will comprise a front 32 in which is provided a window 34 through which are exhibited a plurality of strips 36, these strips being in overlapping relationship such as in a louvre or such as would be analogous to the laths of a Venetian blind. The strips may be protected by, for example, a sheet 38 of glass or plastic.

The apparatus 30 will, in accordance with one of the contemplated uses thereof, be suitable for the display of advertising and for this purpose will be installed at locations whereat they may be easily viewed by large magnitudes of people. Thus, for example, apparatus of the invention may be installed in theater lobbies, transportation depots, supermarkets, and other such retail outlets, and the like.

The apparatus will be expected to operate continuously for long periods of time and without requiring maintenance or supervision.

The apparatus will also, in accordance with what has been noted hereinabove, be adapted for the continuous and cyclical interchange of groups of strips whereby a repetitive series of displays will be exhibited. This requires the withdrawal of one group of strips from the extended position illustrated in FIG. 1 to a withdrawn position and the concomitant movement of another group of strips through the first said strips in interleaved relationship therewith into extended position.

In the arrangement proposed in accordance with the invention, any number of groups of strips is theoretically possible. Usually, however, there will be no more than ten such groups and preferably two to six such groups will normally be employed.

In the apparatus of the invention, the number of such groups can be varied. Thus, for example, where initially three displays are to be exhibited and the apparatus is set up for this number of displays, a change can be subsequently made without substantial difficulty to substitute four displays or exhibits in place of the original three.

Figure 4:
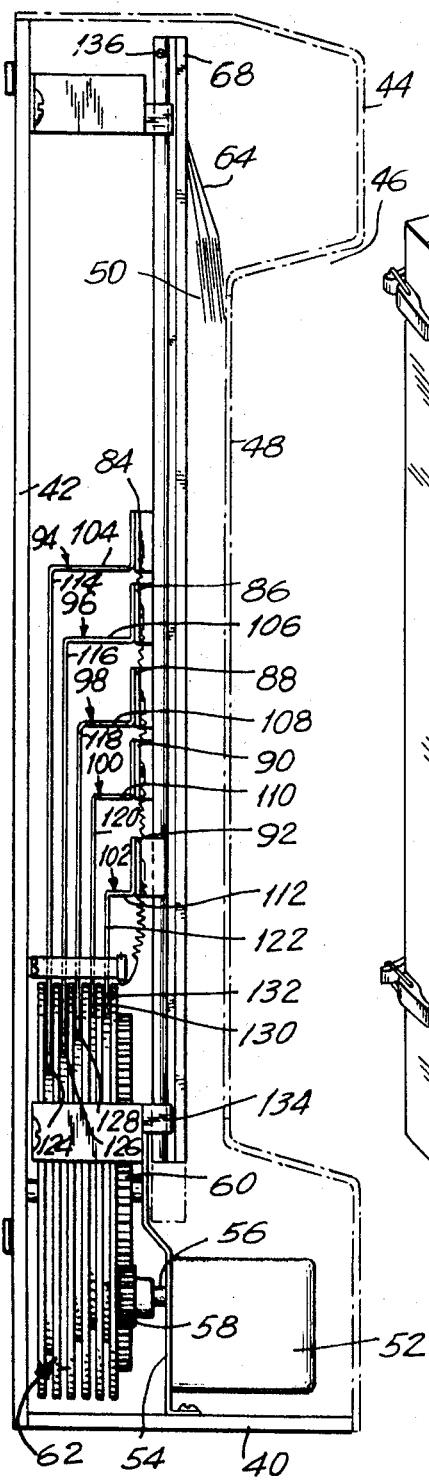
FIG. 4 is a side view of drive and supporting mechanism illustrated in FIGS. 2 and 3.
Figure 2:
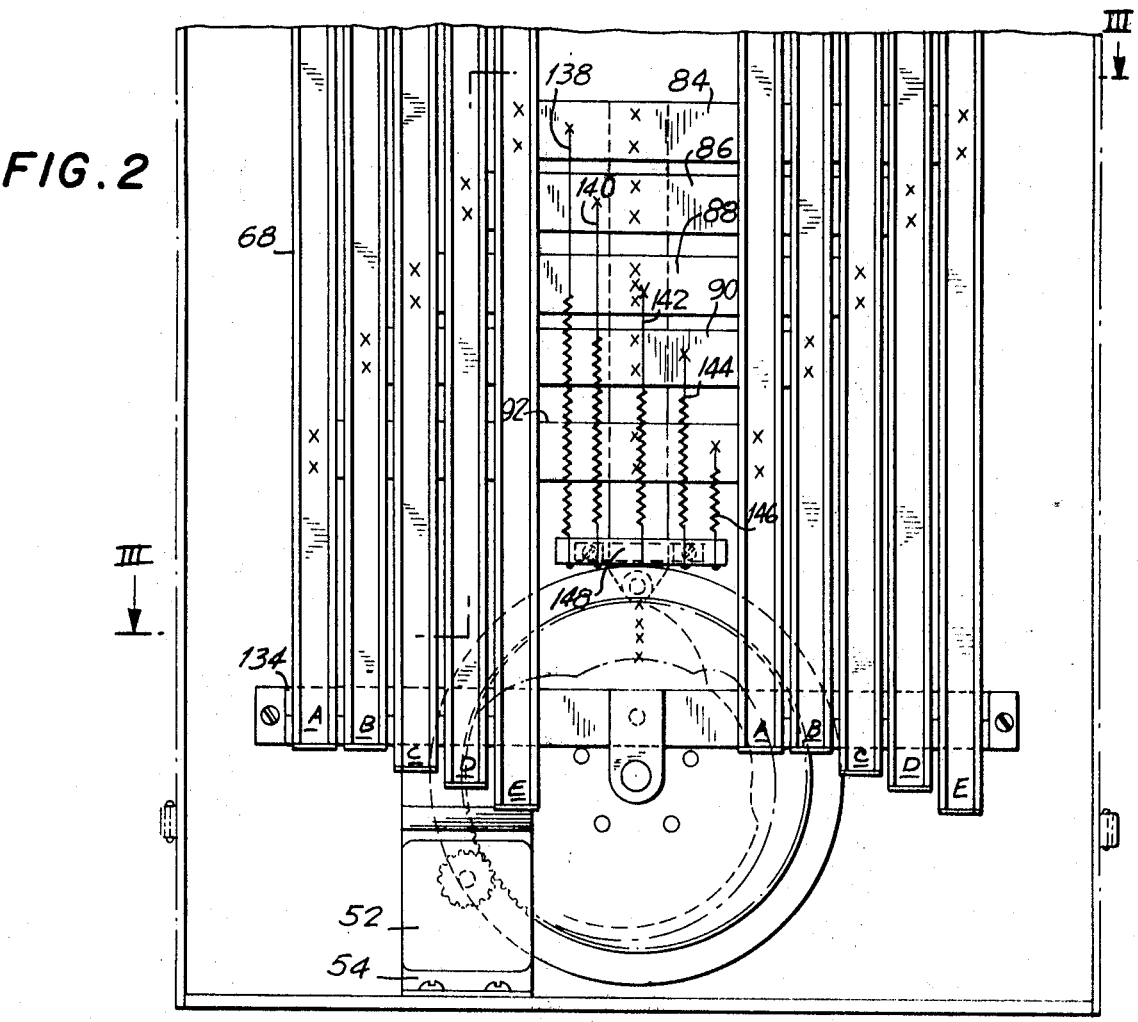
FIG. 2 is a front view, partially broken away, of an interior drive and supporting mechanism by means of which the strips in the apparatus of FIG. 1 are selectively brought to display or extended position.
Figure 3:
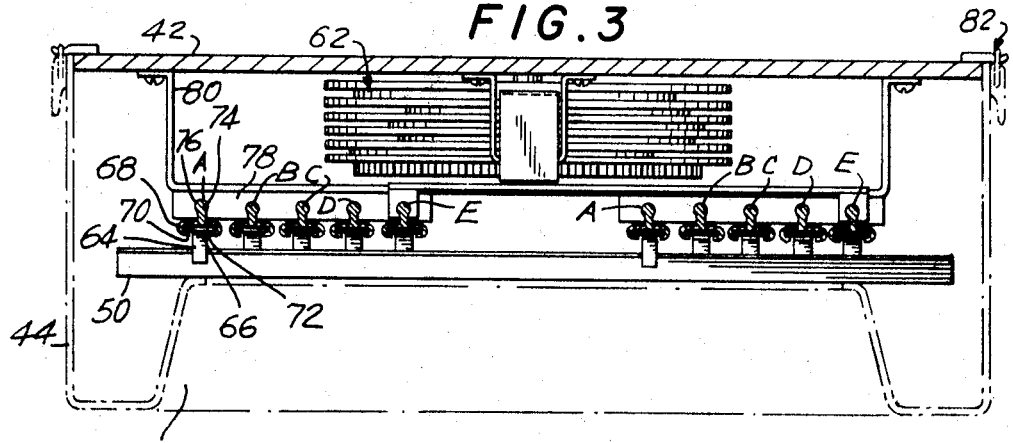
FIG. 3 is a cross-sectional view taken along line III—III of FIG. 2.

FIGS. 2–4 illustrate the means by which the groups of strips are displaced relative to one another in accordance with the invention. First of all, it will be noted that the housing consists of a base 40, a back 42 and a front 44. The front is provided with a recess 46 in which the window 48 is provided. Through the window 48, as has been noted above, can be seen the strips, herein indicated at 50.

The strips of each group are in overlapping relationship, thus having exposed edges bearing intelligence which cooperatively constitute, by way of example, a scene. More particularly, the scene may be constituted by a geographical picture, a picture of some home activity, a picture of an athletic event, a text, mathematical figures, and so forth. Each group of strips will normally portray different intelligence.

To bring the different groups into proper registration for exposure, there is basically provided an electric motor 52. This motor is preferably supplied with power from an exterior source and is a constant speed motor running, for example, at a speed of 14 r.p.m. to provide a cam speed of 2.33 r.p.m.

The motor 52 is mounted on the base 40 by means of a bracket 54 through which extends the motor shaft 56. The motor shaft 56 drives a gear 58 which in turn drives a gear 60 affixed to an assembly 62 of cam elements which will be described in greater detail hereinafter.

The strips are connected to fingers 64, the details of the strips and fingers being described in greater particularity hereinafter. It will be noted at this time, however, that the strips 50 are suspended in hanging relationship by said fingers. The fingers are mounted on flexible supports 66 which themselves would normally not be of sufficient strength to support the fingers 64 and the strips 50 without buckling. The flexible supports 66 are, however, accommodated within rigid elements 68 which are fabricated, for example, of aluminum, steel, plastic, or the like. These elements 68 are channel-like elements having openings in which the flexible supports 66 are accommodated. Elements 68 are provided with toed-in extremities or flanges 70 and 72 by means of which flexible supports 66 are retained in position.

The rigid elements 68 extend vertically throughout the entire height of the group of supports which is supported thereby. Each element 68 is, moreover, provided with a bulbous protrusion 74 which is accommodated in a socket opening 76 in a guide member 78 mounted by a support bracket 80 on the back section 42.

Guide 78 can be fabricated from individual bars or strips made of plastic or metal as illustrated but may alternatively be fabricated of a plurality of segments as will be shown hereinafter.

Mounted on the back section 42 and side section 44 are the cooperating elements of a plurality of latches 82. This provides the feature that the front section 44 is removable which in turn provides for ready access to the strips 50 and the associated supporting and driving elements. The main purpose for this is that this facilitates use of the casette arrangement to be discussed hereinunder, although it provides for maintenance and other conveniences at the same time.

The elements 68 are arranged in pairs, the individual elements of which are on opposite sides of the axis of symmetry of the device. One such pair is, for example, indicated by the use of the reference A in FIG. 3, the other pairs also being alphabetically identified. Each such pair supports all of the strips of a respective group of strips which cooperatively function to display a unit of intelligence. The elements 68 of a pair are connected by a cross arm, these being indicated respectively at 84, 86, 88, 90 and 92 in FIGS. 2 and 4. These cross arms are fabricated of a material of suitable strength which may be, for example, a metal such as aluminum or steel. It will sometimes be possible to employ other materials such as plastic or wood.

Each such pair of rigid elongated elements moves as a unit due to its being connected by means of the associated one of the aforesaid cross arms. Thus the group of strips connected to a given pair of rigid elements likewise moves in unison. The different pairs of rigid elements and therefore the different groups of strips, however, move individually of one another and in a manner to be described in greater detail hereinafter.

The means by which the groups are moved according to a predetermined pattern includes the inverted L-shaped elements 94, 96, 98, 100 and 102, which are respectively connected by legs 104, 106, 108, 110 and 112 to respective of the aforesaid cross arms.

Extending downwardly at right angles from the above-noted legs are perpendicular legs 114, 116, 118, 120 and 122. As can be seen, elements 94–102 are arranged in nesting relationship.

At the lower free extremities of legs 114–122 are wheels 124, 126, 128, 130 and 132. These wheels rest upon the edges of the cam elements constituting arrangement 62 and said wheels and the legs to which they are attached thereby constitute cam followers.

Lower guides for the rigid elements are indicated at 134 and thus the rigid elements are supported for slidable vertical displacement at the upper and lower portions thereof. To prevent detachment of the rigid elements from the guides, each element may be provided with a stop pin 136. As will be shown hereinafter, the stop pin 136 on each such element functions not only to prevent detachment of the rigid elements, but moreover to provide the possibility of bringing these elements into a common rectilinear alignment for purposes of casette-style replacement, as will appear more fully hereinafter.

While it is possible that the weight of the strips and associated support elements would be sufficient to maintain the cam followers against the cam elements of arrangement 62 without additional assistance, there is proposed the use of springs 138, 140, 142, 144 and 146. These springs are attached at their upper ends to respective of cross arms 84, 86, 88, 90 and 92 and at their lower ends to a bracket 148, which serves also as a guide for the cam followers. Springs 138–146 serve to assure that the cam followers will be maintained in close contact with the associated cams so that the related strips will always be properly positioned.

The cam arrangement 62 as noted hereinabove consists of a plurality of cam elements. These cam elements are in the preferred embodiment of the invention identical in configuration but are rotationally displaced from each other by a number of degrees equal to 360° divided by the number of groups involved. One such cam element is illustrated in FIGS. 5a and 5b and the assembly of such elements will be described in greater detail hereinafter.

As seen in FIGS. 5a and 5b, each cam element consists of a raised portion 150 connected to and integral with a spacer portion 152 which is of greater diameter. The raised portion 150 is in fact the effective cam element and it is the edge 154 thereof which controls the movements and positioning of the strips.

In FIG. 5a are illustrated five circles, A, B, C, D and E. These correspond to the cam followers in FIGS. 2–4 and show the relationship between the cam elements and the related rigid elements 68. The circles A, B, C, D and E are in actual practice superimposed to have respective axes of rotation lying in a common vertical plane. They are additionally illustrated as being rotationally displaced in FIG. 5a to account for the fact that the cam elements themselves are rotationally displaced as noted hereinabove and as explained more fully hereinafter. The superimposing of the cam follower circles A, B, C, D and E is indicated generally at 156 wherein it can be seen that the axes of rotation thereof all lie in common vertical plane 158.

Section 160 of the effective edge of each cam element represents the part of the cycle in which the associated cam follower is permitted to move to its maximum downward extreme. When the cam follower of a group of strips is engaged with the section 160 that group of strips is at its lowermost or extended position and the strips thereof are exposed in overlapping relationship.

More particularly, as illustrated in FIG. 5a, cam follower E is in engagement with section 160 and group E of strips is in its lowermost extended position.

At the same time, cam follower D is at relative position illustrated at 166, this corresponding to the position of D displaced counterclockwise around the edge 154 in the illustration of FIG. 5a. Similarly, cam followers C, B and A are successively raised to their various levels above cam follower D and the corresponding groups of strips are raised by identical amounts.

The cam element rotates in a direction indicated by arrow 162. Therefore cam follower E will next engage section 164. The cam follower will thus be caused to raise and it will carry the corresponding group of strips along with it. The short duration and relatively great angle of the section 164 will cause a rapid rise of cam follower E in a relatively short period of time whereafter cam follower E will come into engagement with section 166, it being now understood that the cam follower E is constrained to remain on its axis in plane 158 while being free to indulge in vertical displacement as the cam element rotates on axis 168 (cam followers A, B, C, D and E operate in a similar manner, but are controlled by cam elements which are rotationally displaced relative to the cam element controlling the respective cam followers).

Section 166 is of gradually increasing radius. As a result cam follower E will continue to rise gradually once it has come into contact with section 166. This operation will be shown in greater detail hereinafter.

Subsequently, as the cam element continues its rotation, the cam follower will come into engagement with section 170. This section is a relatively short section of constant radius which is the maximum radius which the cam element has with respect to axis 168. When cam follower E engages this section it will be displaced to its uppermost position which is a position corresponding to that position illustrated for cam follower A in FIG. 5a. When cam follower E is in this position, the corresponding group of strips will be displaced to its fullest extent in upward direction and these strips will then be in fully withdrawn position.

FIG. 6 is a time chart showing the movements of the five groups of strips A, B, C, D and E. It should now be understood that this movement is identical for the corresponding cam followers, the corresponding rigid elements 86, the corresponding strips 50 in their respective groups, and the upper and lower edges of these strips, as well as all elements connected thereto. For purposes of discussion of the chart in FIG. 6, however, it will now be assumed that the respective curves illustrate the corresponding bottom edges of the strips 50 except where otherwise stated. It will also be understood that the ordinate of the graph represents cam rise in inches or other corresponding dimensions and that the abscissa represents either angular degrees of rotational displacement of the corresponding cam elements or the corresponding cycle rotation of strip movement.

Considering first the movement illustrated by curve 172, this represents the progressive location or movement of the bottom edge of all of the strips in group E. At first, as indicated at 174, the bottommost edge is in its lowest position or in other words its position of dwell in its lowermost extended state. Thereafter, at 176 this edge begins to rise as indicated at 178. During this time the edge is being withdrawn from its fully extended position. Stated otherwise, from point 180 to point 176 the lowermost edge dwells in fully extended position. At point 176 under the influence of the corresponding cam element the edge rises. It rises at a constant relatively rapid speed until it comes to point 182 at which time the shape of the corresponding cam element reduces the speed of rise. Thereafter the edge proceeds to rise at a relatively slower rate along section 184 of the curve. This rate of rise is constant until the edge arrives at point 186. At this time the edge is in its fully withdrawn position at which it stays until point 188. At this time the shape of the corresponding cam element permits the cam follower to drop carrying the edge along with it so that the edge proceeds along cross section 190 to point 192. This drop is at a relatively fast rate of speed compared with section 184. The lower edge then moves into its position of dwell in fully extended position as indicated at 194 which it will be realized extends linearly into section 174 with the process being then ready to repeat itself.

Curve 196, which is identical with curve 172, although some variation would be permissible, includes the same elements. For example, it includes a bottommost dwell period 198, a period 200 of rapid withdrawal from bottom dwell, a period 202 of slow withdrawal until the period 204 of uppermost dwell at fully withdrawn position is obtained. The curve then continues in a closed cycle at 206 whereat the strip drops rapidly back to its position 198 of dwell at its fully extended position.

The curves for C, B and A are also identical, but are displaced by 72°, this being the full cycle of 360° divided by five, which is the number of groups involved.

Up to this point there has been a discussion of the lower edges of the respective strips and specific attention is now directed to the lower edge of C indicated at 208. Every lower edge has of course associated with it an upper edge. The upper edge corresponding to lower edge 208 is indicated at 210 and it will be possible to visualize the expanse of the associated strip extending between these two edges. This expansion is equal to a width of the strip indicated at W with respect to which it will be noted that the upper dwell positions of full withdrawal such as seen at 204 are spaced from the lower dwell positions by a distance S which is less than W.

This means that none of the lower edges of any of the strips are ever withdrawn to an extent that they rise above the upper edges of any of the corresponding strips in the other groups. This in turn means that these edges are never in a position to snag against one another which greatly minimizes damage due to wear, tear or deterioration of the strips.

Another feature of the invention to be appreciated from the chart in FIG. 6 is that the periods of bottom dwell are virtually continuous except for the intervening periods 212 in which none of the strips are in their bottom dwell positions of full extension. This is a purposefully provided type of motion, their disposition deriving from a study of behavioral science. More specifically, it has been found that this type of interchange has a peculiar magnetism for the eye of an observer such as to draw the attention of the observer to the display apparatus. As a consequence thereof it is preferred, in accordance with the invention, that there be a slight interruption in the continuous maintaining of the strips at bottom dwell position in order to achieve great attraction.

Another feature of the invention to be observed is that the distance travelled by a strip in passing through those sections corresponding to section 200 of curve D is equal to the distance travelled by the strip in passing through the section 202. It has been found that this enables an appropriate disposition at the intersection of the movement of two adjacent strips as indicated at 214 to minimize the possibility of the strips snagging on one another. Intersection 214, it will be noted, preferably occurs at distance S divided by four from the position of bottom dwell, this having been determined to be the preferred location of this intersection.

There are still other and further advantageous features of the invention to be seen in the chart of FIG. 6. Thus, for example, it will be appreciated from the chart that only one group of strips is at the bottom dwell position (full extension) at a given time. More specifically, when group D is in bottommost position the remaining groups are displaced therefrom. When group C is in bottom dwell position, the remaining groups are displaced therefrom, and so on.

Similarly, with respect to the top dwell positions, only one group of strips occupies a top dwell position at a given time. Thus, for example, with respect to curve section 204, this indicates the top dwell of group D, while during this entire period none of the other groups are in top dwell. This means that there is no coincidence of different groups at top dwell and no possibility of wear and abrasion between the strips of the various groups.

Another advantageous aspect of the invention will now be referred to by way of example and particularly by regarding, for example, sections 216, 218 and 220 of curves E, D and C. These curve sections, as will be observed, generally occur while the remaining two groups are respectively in top dwell and bottom dwell positions or immediately before and after such time.

These curve sections are equally spaced and are of constant and like slope. This means that the corresponding strips are moving at equal rates of speed in the same direction so that there is no possibility of wear, friction and/or abrasion therebetween. This is an additional aspect of the invention which militates in favor of extended use in the field without the need for maintenance and/or repair.

Yet another feature of the invention relates to the relative positioning of the fingers on said strips. Reference to FIG. 6 will show that the distance from the bottom extremity of such finger to the bottom edge of the corresponding strip is a distance M which is less than the distance S between the upper and lower extremities of movement.

The above observations made with respect to the chart of FIG. 6 are by no means exhaustive of the various improvements and benefits which the invention provides in the technique of displacing groups of strips relative to one another. They are, however, exemplary of the manner in which the invention anticipates certain difficulties which might be encountered in continuous operation of such apparatus, as well as the manner in which the invention precludes the possibility of such problems arising.

Another aspect of the invention relates to the provision and utilization of casettes. As can be seen from the foregoing description, the arrangement and movement of the strips is complicated and sophisticated. It follows as a natural consequence thereof that when such devices are distributed in the field, it might be extremely difficult to service them with respect to replacing the groups of strips with substitute strips. As a matter of fact, with constructions of a similar nature heretofore known and available, this type of servicing of such apparatus has been impossible with the result that, when it has been necessary to change the strips, the devices had to be recalled from the field and worked on in the factory. This is not economically suitable or advisable especially with respect to display devices in which the displays are to be changed frequently and continuously. It is therefore of great advantage to provide an improvement for such display devices by means of which rapid and convenient changes of display units may be made. The invention provides for a casette or cartridge-type arrangement of displays whereby the groups of displays may be collectively replaced and whereby the groups may be individually replaced. Moreover, the invention provides further for an arrangement whereby the individual strips may be readily and conveniently replaced.

Before, however, discussing the types of casettes which may be employed in accordance with the invention, it is suitable to note that the drive mechanism of the invention, including for purposes of illustration but not limitation the cam elements referred to above, normally occupies a position which would interfere with the facile insertion of a substitute set of group of strips. FIGS. 7–9 show an arrangement employed in accordance with the invention by means of which this difficulty is avoided.

In FIGS. 7–9 appear a base 300 and a back section 302 of a display apparatus. The apparatus is partially broken away and partially omitted in order to illustrate and emphasize those features of the construction which are important to this embodiment of the invention.

Towards the top of the unit is indicated the guide element 304 in which the elongated rigid element 306 which support the groups of strips are accommodated. These rigid elements 306 include stop pins 308. The stop pins are normally not effective since the rigid elements 306 are elevated by the associated cams and cam followers to a position whereat the stop pins 308 are elevated above the guide 304.

Below the guide 304 is shown the cam arrangement 310. This consists of a plurality of cam elements as discussed hereinabove with which are each associated cam followers as has also been indicated hereinabove. The cam arrangement has associated therewith the motor 312.

The motor and cam arrangement is supported in a frame 314 fabricated of steel or aluminum or the like, having an arm 316 supported on a pin 318 accommodated in a bracket 320 attached to the rear section 302. Attached to the frame 314 is a bracket 322 having an opening 324 accommodating a shaft extending between the motor and cam arrangement.

A latch arrangement 326 is provided by means of which the frame 314 is held in the position illustrated in dotted lines. When the latch mechanism is released the arm and frame can pivot around pin 318 to the position shown in chain lines. The cam followers (not shown) tend to follow this movement under the influence of gravity and also due to the influence of springs attached to the cam followers if such springs are employed. However, this movement is limited by engagement of stop pins 308 with guide 304 which will arrest the movement of the rigid elements 306 and the associated cam followers. At this point, the rigid elements 306 will all be appropriately aligned to receive the insertion of a cartridge of new strips as will hereinafter be explained.

One such strip 328 supported on a finger 330 in turn supported on a flexible support 332 is shown by way of example, the general nature of these elements having been described hereinabove. The particular arrangement of such strips will next be discussed with respect to FIG. 10.

FIGS. 10a to 10e illustrate corresponding strips, each being taken from a respective one of five groups of strips of which each group is intended to exhibit a different scene or the like. The strips are designated as corresponding strips since they are correspondingly positioned in their respective groups and will all come to the same identical bottom dwell position of full extension in operation. Each of these strips in its own group will have a plurality of additional strips arranged in overlapping relationship with one another and will have in common with the other strips in the same group the fact that the fingers associated therewith will be positioned in corresponding relation.

Figure 10A:
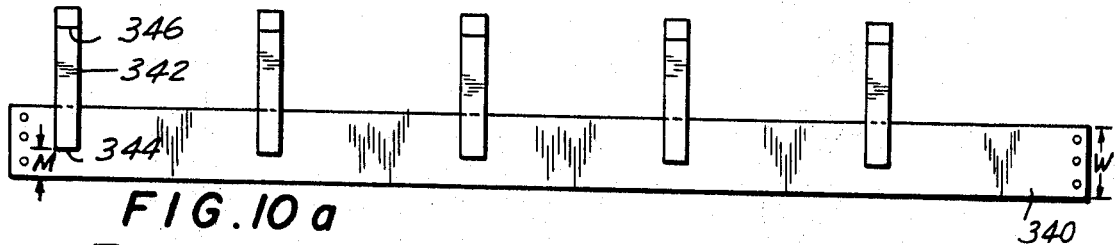
FIGS. 10a–10e illustrate respective strips of different groups.

FIG. 10a illustrates a strip 340. Strip 340 may have, for example, a width W of 1.875". Distributed longitudinally along said strip will be a plurality of fingers 342. These fingers are illustrated as being five in number. However, any number of fingers may be employed provided the number is dimensionally consistent with the remainder of the apparatus, and the number of fingers will usually correspond to the number of associated rigid elements. It should be noted, however, that preferably more than one finger is employed per strip to prevent skewing during travel.

The fingers extend transversely of the strips. In the illustrated example, the lower extremity 344 of each of the fingers is located a distance M above the bottom of the corresponding strip, M being equal to .750". This means that the fingers extend more than half way across the strips.

The fingers may be integral with the strips but are preferably separate therefrom so that the strips and the fingers can be fabricated of different materials having different physical characteristics.

The fingers may be, for example, die cut from stiff pressed paperboard having, for example, a thickness of .015". The upper extremity of each finger is scored or creased as indicated at 346. This scoring or creasing acts as a hinge so that each finger is effectively constituted by two hingedly connected sections. All of the strips have identical fingers. It is to be noted, however, that the fingers are connected to the front faces of the strips in FIGS. 10a, 10c and 10e, whereas the fingers are connected to the backs of the strips in FIGS. 10b and 10d. This feature of the invention is to prevent jamming in the casettes and to minimize the thicknesses of the stacked piles of strips in the casettes as will be discussed hereinafter.

As to the nature of the strips themselves, the quality and weight of the stock from which they are formed is important to the overall finished appearance. The strips may be formed of plastic or metal foil but paper is the preferred material from which the strips are made, "paper" covering conventional papers and paper-like materials. A paper thickness of approximately .700 or more is recommended for displays of 21" x 28" and larger. Such thickness insures paper stability and eliminates curling. A paper having a thickness of, for example, .400 will be adequate for smaller displays.

The strips are made from posters which should be of such a size as to provide at least about 2" of selvage area at the top and bottom and a minimum of about 1" of selvage area on each side.

Preferably a matte-finished paper should be employed as glossy or varnish finishes are reflective and will tend to emphasize the discontinuity between adjacent strips.

Lithographic and photogel processes and the like are preferably employed. Screening processes can also be employed but are not recommended due to registration problems and the quality of the inks normally employed therein.

Figure 10B:
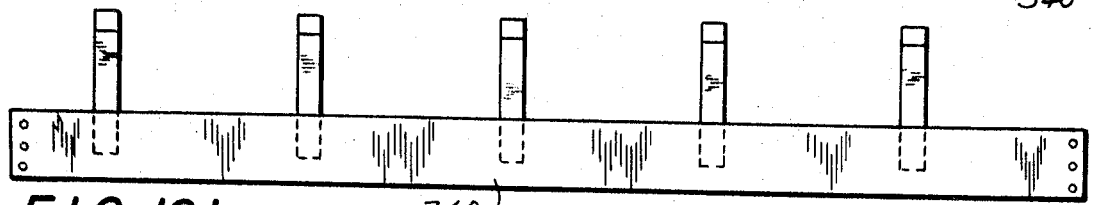
Figure 10C:
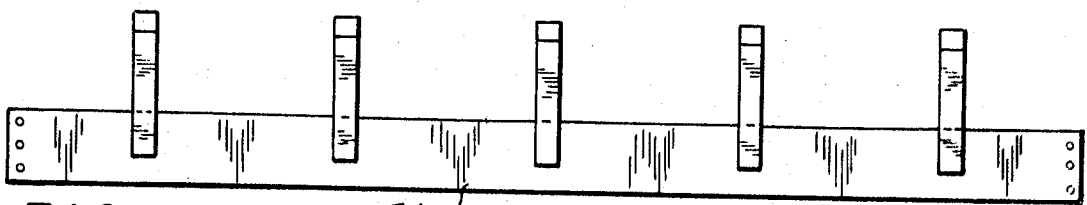
Figure 10D:
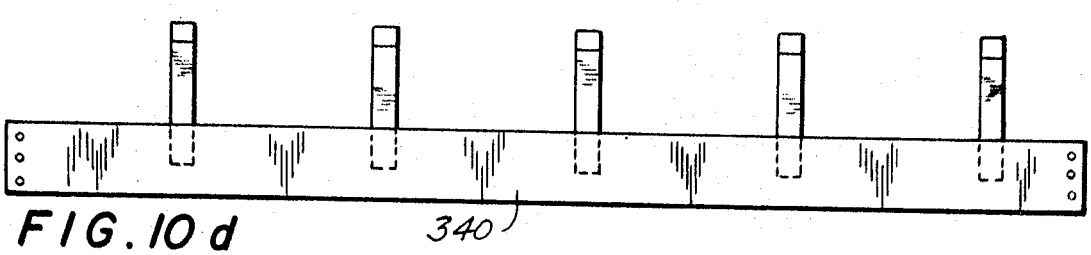

Referring again to FIGS. 10a–e, it will be seen that the fingers on the respective strips are staggered. All of the fingers of group A will be disposed as indicated in FIG. 10a. All of the fingers of group B will be disposed as illustrated in FIG. 10b and so on.

Figure 10E:
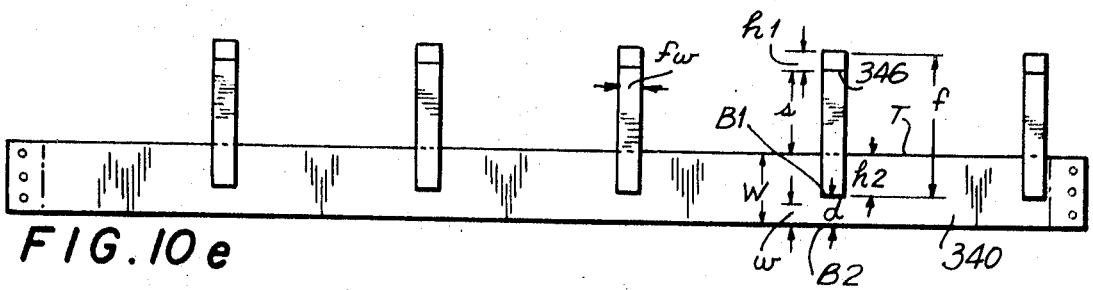
Figure 11:
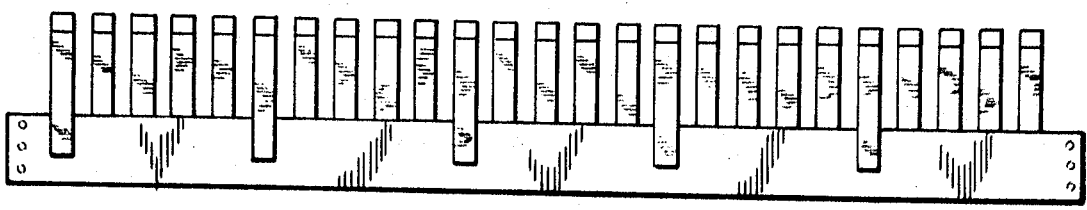
FIG. 11 illustrates an assembly of the strips of FIGS. 10a to 10e.

Taking the five strips illustrated in FIGS. 10a–e, these will be stacked together in a pile as indicated in FIG. 11. There will be as many of these piles as there are strips in a respective one of the groups and in each pile the strips from the different groups will be arranged in the same sequence. These piles will be arranged in overlapping sequence in a casette and attached to suitable supports as is best seen in FIG. 12.

In FIG. 12 is shown an alignment 348 of parallel vertical flexible supports arranged one behind the other (in this figure of the drawing) which supports are ultimately to be accommodated in rigid elements as has already been exemplified. A pile 350 of strips 340 previously discussed with respect to FIG. 11 is arranged transversely of alignment 348 and the fingers 342 thereof are respectively attached to corresponding flexible supports in the alignment 348.

A second pile 352 of strips is superimposed in overlapping relationship with the pile 350 and the fingers 342 thereof are connected to the corresponding flexible supports. The bottom edges of the two piles are spaced at a distance R which is the amount of exposure at the bottom edges of each of the strips. As many piles of strips will be mounted on the supports as there are strips in a group. As will be shown, these are inserted in casette style into a display device wherein the rigid elements have been brought into rectilinear alignment as discussed with respect to FIGS. 7–9 and, after the flexible supports are connected to the rigid elements, the cam elements are brought back into operative position whereupon the rigid elements will be displaced and the strips in each pile spaced apart to effective starting and operating positions.

Before proceeding with a detailed explanation of some casettes employed in accordance with the invention, it is to be noted that the fingers 342 may be attached to the strips by the use of heat seals or cements such as rubber cement and the like and that the fingers can be attached to the flexible supports by means of staples, heat seals or also by cements.

In addition, before undertaking a detailed description of some casettes employed in accordance with the invention, note should be taken of the fact that the strips and related dimensions and connected parts are not selected arbitrarily. Rather, they are particularly related to achieve a maximum economy in materials, while at the same time to afford optimum protection against deterioration and damage.

The relationships referred to hereinabove can be seen by reference to FIG. 10e wherein is illustrated the didension W which is the common width of all the strips as has been stated hereinabove. Not only do the strips have a common width, but the strips when in exposed position furthermore have a common width of exposed area constituted by the lower edge portions thereof. The width of the exposeds portions is indicated at $w$ also in the FIG. 10e. The width W of the strips and the width $w$ of the exposed portions have dependence upon one another and also upon the number of posters or reproductions which are employed to prepare a display in accordance with the invention and it will be understood that at least two posters will have to be employed and preferably more since the strips are in overlapping relationship whereupon a major portion thereof will be concealed.

More particularly, the width W is equal to the number $n$ of posters employed, multiplied by the width $w$ of the exposed portion. Thus, for example, if three posters or reproductions are employed and exposure width $w$ equal to .625" is desired, a strip width W of 1,875" will be employed.

The amount by which the strips are vertically displaced has a preferred relationship to the strip exposure width $w$. The preferred formula in accordance with the invention is that vertical displacement of the strips and thus the rigid elements attached thereto will be twice the strip exposure width $w$. Thus, for example, if a strip exposure width $w$ of .625" is desired or employed, the vertical displacement will be twice this amount, or 1.250". Some variation in this is possible. However, the formula set forth is preferred.

Actually, it is not considered practical to employ less than three reproductions per group of strips for an exposure, for example, of .625". For a .400" exposure width it is preferred that four identical reproductions be employed. Theoretically, it is possible to use two posters having .625" exposure and three posters or reproductions having .400" exposure. This smaller number of reproductions would, however, reduce the strip width W below a preferred acceptable minimum to assure sufficient finger length to paper attachment area for adequate strip stability.

As to the distance $d$ between the bottom B1 of a finger and the bottom B2 of a strip, this is preferably equal to the exposure width $w$ plus one-fifth $w$. Thus, for example, for a strip exposure of .625", this would be equal to .625" plus .125", making $d$ equal to .750".

Another important distance is the length of a finger 342 from the hinge 346 to the top T of the associated strip 340. This distance $s$ is preferably equal to the total strip movement plus about 1". For example, if as noted above, the vertical movement is equal to 1.250", the dimension $s$ is equal to 1.250" plus 1" which equals 2.250". This is considered the minimum dimension necessary to assure a proper lay of the paper while at the same time keeping the distance from the top of the overall picture and the top of the case or housing within practical dimensions.

The height of the portion of the finger above the hinge 346 indicated at $h1$ is generally selected to be about .500". The minimum total finger length indicated at $f$ will be equal to $h1$ plus $s$ plus width W minus $d$. Using the aforegoing examples, the finger length should be .500" plus 2.250" plus 1.875" minus .750". This gives a finger length of 3.875". It follows that the additional distance $h2$ of overlap between the fingers and strips will equal the width W minus $d$ which, according to the previously employed examples, equals 1.875" minus .750" equals 1.125".

The width $fw$ of each finger will be smaller than the width of the flexible support to which the finger is attached and the width of the vertical support will depend upon the channel in the rigid element which accommodates the same.

Refernce is made next to one casette assembly as illustrated in FIGS. 13–15, a modification of the structure illustrated in FIG. 15 being additionally illustrated in FIG. 16. In these figures is illustrated a frame 400 consisting of vertical sides 402 and 404 and horizontal sides 406 and 408 extending therebetween. The frame is preferably a right quadrilateral such as a rectangle. The sides, top and bottom are preferably fabricated of wood, but heavy cardboard and plastic materials, as well as metals, may also be employed. The sides, top and bottom are connected at overlapping corners 410, 412, 414 and 416.

The functions of the frame 400 include supporting the groups of strips and associated flexible supports and fingers and protecting the strips, especially during shipment of the casette to a display unit in the field. The casette may be either disposable or it may be salvageable for subsequent use. The frame has a central opening 418 across which the flexible strips are stretched in extended condition.

Considering a flexible support 66($a$), as has been previously discussed relative to FIGS. 2–4, such flexible support will have one end 420 connected to the top 408 of the frame and its other end 422 connected to the bottom 406 of the frame. All of the top ends 420 and all of the bottom ends 422 will be aligned in rectilinear alignment and the strips will be disposed in piles as indicated at, for example, 350 in FIG. 12. In such arrangement the individual strips will be ready for distribution to operative positions and the manner in which this is effected will next be described hereinebelow.

There has been discussed an arrangement whereby the driving elements of the apparatus are withdrawn from operative position as a result of which the rigid elements (e.g. elements 68 in FIGS. 2–4 and elements 306 in FIGS. 7–9) are automatically dropped to their lowermost positions as limited by associated stop pins. When the rigid elements are in their lowermost positions and the driving elements are withdrawn from operative positions, the apparatus is prepared to receive the insertion of a casette. The previously installed strips, fingers and flexible supports can be detached in any manner whatsoever. They are generally no longer useful and can be destroyed. Upon such removal the rigid elements have their respective channels free to accommodate new flexible supports such as those which are supported on the frame 400.

There will be described hereinafter an arrangement of the rigid elments in accordance with which these elements are formed in halves which can be separated to accommodate insertion of the incoming flexible supports. With such arrangement the casette is moved into position and it will be understood that the flexible supports are spaced at a distance corresponding with the channels in the rigid elements intended to receive the same. The flexible supports are inserted into the rigid elements which are, as will be seen, captured in position within the rigid elements whereupon the frame 400 is removed in entirety leaving the flexible supports and associated strips in position in and on the rigid elements which have been described or which are to be described hereinafter.

To facilitate the detachment of the frame 400, the flexible supports are lightly tacked to the top 408 and the bottom 406 so that little force is required o separate and remove he frame. Similarly, staples can be employed to tack the flexible supports to the frame provided that such staples are of a relatively weak wire and will not cause a tearing of the flexible supports or other damage thereto.

It will now be recalled that the rigid elements are all in alignment with one another. The driving elements such as illustrated in FIGS. 7–9 are now brought back into position so that the cam elements thereof are brought into engagement with the respective cam followers. This has the effect of distributing the rigid elements into positions readying the same for the commencement of operation. This distribution will be caused by the fact that the cam elements are rotationally displaced from one another such that the cam followers will be displaced by varying amounts corresponding to the angular position of the cam shaft discussed hereinabove.

To account for the construction wherein the rigid elements are not fabricated of separate parts, the frame construction illustrated in FIG. 16 is provided wherein it will be seen that the top and bottom sections of the frame indicated partly at 424 are provided with a series of regularly spaced vertical grooves 426 having therebetween lands 428 to which the flexible supports 66 are attached as in the previous embodiment. The use of this construction enables the flexible supports 66 mounted on the frame 400 to be inserted vertically downwards into the channels of the associated rigid elements. Thus the flexible supports 66 are collectively inserted vertically downwards whereafter the frame may be pulled outwardly from the rigid elements in the direction illustrated by arrow 430. Such insertion and removal of the frame will leave the flexible support deposited in the channels of the rigid elements and the same operation of restoring the driving unit to operative position will follow as has been previously described.

In the aforedescribed type of casette which may be employed in accordance with the invention, the flexible supports are part of the casette and the rigid elements are a part of the display apparatus. This has the advantage that the casettes will be relatively light in weight while being of sufficient strength as will be imparted by the frame 400. This strength can be supplemented by shielding the frame and related strips in a suitably dimensioned cardboard box or the like for purposes of shipment.

The invention contemplates, however, the provision of a casette arrangement in which the rigid elements are embodied in the casette and are not permanently mounted in the display apparatus, such an arrangement being illustrated in FIGS. 17-19.

This latter casette arrangement (see FIGS. 17-19) includes a frame 450 including sides 452 and 454, a top 456 and a bottom 458. These elements are preferably fabricated of aluminum or some other such material having suitable strength and overlapping at corners 460, 462, 464 and 466, whereat they are fastened together such as by welding or rivets. These corners are, moreover, provided with openings 468, 470, 472, and 474.

Attached to the top 456 are guides 476 and 478, these being provided with guide holes 480 within which are accommodated the bulbous extensions 482 of rigid elements 484 corresponding to those rigid elements heretofore described.

The rigid elements 484 are provided with channels 486 within which are accommodated flexible supports 488 to which are attached fingers 490. The flexible supports 488 and fingers 490 are of the same type and serve the same function as the corresponding elements heretofore described.

Guides similar to guides 476 and 478 are also provided at the bottom of the frame 450 as indicated at 492. The fingers 490 support a plurality of strips 494 stacked in piles in the manner hereinabove indicated. Rigid elements 484 may be held in position by the use of permanent pins at one end and removable stop pins (not shown) provided at the other end.

The rigid elements 484 are arranged in pairs, one element of each pair being on one side of the vertical axis of symmetry of the structure and the other being on the other side of the vertical axis of symmetry of the structure. The pairs of rigid elements are connected by cross arms 496, 498, 500, 502 and 504, these cross arms being of the same type as the cross arms hereinbefore described with respect to previous embodiments.

As in the previously described embodiments, cam followers 506, 508, 510, 512 and 514 are connected with the cross arms. At the bottoms of these cam followers are positioned wheels 516, 518, 520, 522 and 524 which, together with the arms on which they are mounted, constitute cam followers.

The construction noted hereinabove constitutes a casette arrangement. It is intended that this casette arrangement be mounted on brackets provided in the display apparatus. Such brackets are indicated at 526 and 528, there being four such brackets corresponding to holes 466, 468, 470 and 472. By means of bolts such as indicated at 530 and 532, the frame 450 is mounted in position in brackets 526, 528 and so forth, this providing for proper positioning of the casette in the unit considered.

As in the previous embodiment of the invention, preparation is made for inserting this casette arrangement by detaching the previously installed unit. To accomplish this, the drive unit including the cam elements is pivoted downwardly out of operative position and the previously installed casette removed. Thereupon the new casette is installed by means of bolts as described above at which time, it will be noted, the rigid elements 484 will all be registered with one another in rectilinear alignment.

Thereupon the drive unit is tilted back into operational position, the wheels 516-524 engaging their corresponding cam elements and being elevated thereby to varying extents, thereby fanning out the strips in each pair and bringing them to locations corresponding to one definite but arbitrary point on the cam chart discussed hereinabove. At this point the unit will be ready for operation with a complete new set of exhibits or displays having been installed.

It is also contemplated within the scope of the invention that the individual strips will be replaced as may be required for various reasons. An improvement of the invention permitting this possibility is illustrated in FIGS. 20-22.

In FIG. 20 is illustrated a carrier leave 550, this carrier leave being fabricated of a paper-like material such as cardboard, oaktag or such. The carrier leave 550 consists of a strip 552 of elongated right quadrilateral shape corresponding to the strips heretofor described and integral therewith are a plurality of fingers 554, 556 and 558. Each finger is provided with a hinge 560 of the type heretofore described. The carrier leave 550 is not required to bear intelligence printed thereupon. Instead it is intended to carry a strip 562, as illustrated in FIG. 21. This strip 562 corresponds to the strips heretofore described and may be of paper or other such material bearing intelligence printed or otherwise deposited directly thereon.

To provide for mounting the strip 562 on the carrier leave 550, the carrier leave is provided with a number of tabs 564, 566, 568 and 570. These tabs extend into cut-outs 572, 574, 576 and 578, in which the tabs are formed.

Tabs 564 and 566 extend vertically upwards and are intended to be engaged by semi-circular cut-outs 578 and 580 provided in strip 562. Tabs 568 and 570 extend laterally outwards and are intended to be engaged by semi-circular cut-outs 582 and 584.

Tabs 564 and 566 support the strip 562 in a vertical sense and tabs 568 and 570 maintain the strip 562 in fully stretched attitude on the carrier leave 552. The combination of these elements is illustrated in FIG. 22.

In FIG. 22 can, moreover, be seen the fingers 554. The fingers 554 bear the same relationship to the strip 552 as has been outlined in detail hereinabove with respect to the construction in which the fingers are bonded or otherwise attached directly to the associated strips. The openings 578 and 580, for example, are located sufficiently far above the lower edge 586 of the strip as indicated by dimension X so as not to be exposed to view when the associated exhibit is being displayed.

FIGS. 23 and 24 illustrate the assembly of the cam elements referred to hereinabove. Thus, for example, there are a plurality of cam elements 600, 602, 604, 606 and 608 separated by spacers 610, 612, 614, 616 and 618. The spacers, as noted hereinabove, are integral with the associated cam elements.

In FIG. 23 is shown the drive element consisting of a spacer 620 and a crown gear 622 integral therewith. This element, as are the cam elements and spacers, is provided with a plurality of holes 624 through which extend bolts 626 serving the purpose of holding all of these elements together. Extending coaxially through the assembly may be provided an oilite bearing as indicated at 628.

This construction of an assembly of gear elements not only facilitates manufacture, especially where the cam elements are identical with one another but, moreover, facilitates adjustment of the cam elements relative to one another if desired for purposes of changing the motion of the different groups of strips. To this end the openings provided in the cam elements in correspondence with holes 624 may be provided with a configuration of limited arcuate scope.

Figure 25:
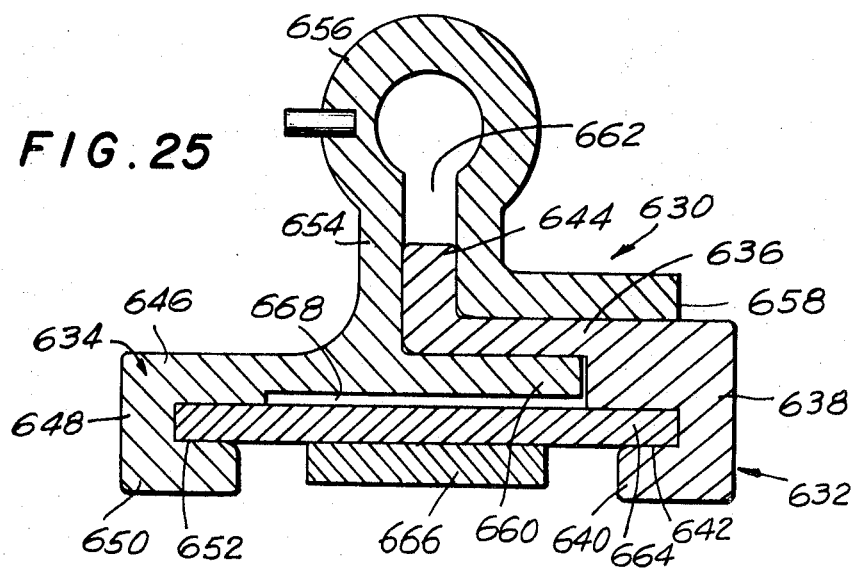
FIG. 25 is a cross-sectional view through a rigid element adapted for supporting a flexible support on which fingers of the aforesaid strips are in turn supported.

It has been heretofore mentioned that the rigid elements supporting the flexible supports in the various embodiments might be formed in two sections which are separable to permit the lateral insertion of the flexible supports such as for use in connection with the casette arrangements described above. FIG. 25 shows one such arrangement which has been anticipated within the scope of the invention.

In FIG. 25 is more particularly illustrated a rigid element 630 consisting of sections 632 and 634. Section 632 includes a leg 636 having a perpendicular extension 638 supporting a flange 640 defining a channel 642. Leg 638 supports a perpendicular extension 644.

Section 634 includes a leg 646 having an arm 648 supporting a flange 650 defining a channel 652.

An arm 654 extends perpendicularly from leg 648 and supports circular portion 656 which constitutes the bulbous portion heretofore described as being supported by the guides forming part of the display apparatus. An extension 658 is connected to the bulbous portion and together with a second extension 660 provides a means for straddling leg 636 of section 630 which hooks into position within channel 662 as is readily apparent.

The two sections of the rigid element as discussed are readily engaged by longitudinal displacement relative to one another. Channels 642 and 652 cooperatively support the ends of a flexible support 664 in turn supporting a finger 666 of the type hereinabove described. A gap 668 may be provided between the flexible support and rigid element to accommodate a staple if such is the means by which the finger is connected to the flexible support.

As will be understood, section 632 may be disengaged from section 634 which permits the ready insertion of a flexible support 664 into channel 652 by lateral rather than longitudinal displacement. With the flexible support 664 in position, section 632 may then be engaged with section 634 by relative longitudinal displacement following which the flexible support will be locked into position This facilitates the use of different types of casette arrangements including one of those heretofore described above.

Figure 26:
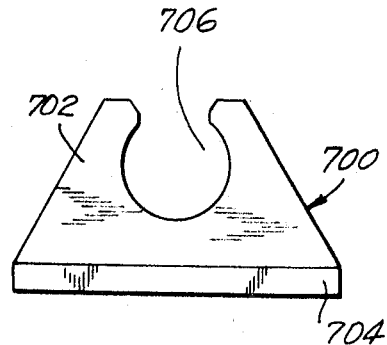
FIG. 26 illustrates a segment of the type which can be employed to constitute guides for the rigid elements in the aforesaid embodiments.
Figure 27:
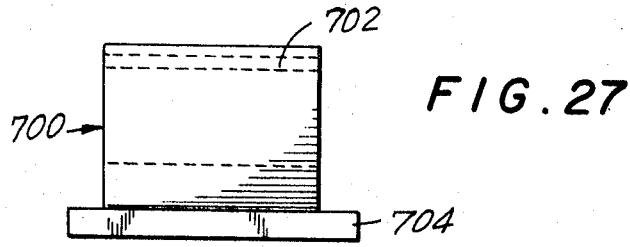
FIG. 27 is a side view of the construction illustrated in FIG. 26.

Finally, FIGS. 26 and 27 illustrate segments which can be employed to constitute the guides for the rigid elements, such segments being indicated at 700. Each segment will have a trapezoidal shaped body 702 supported on a base or flange 704 and provide with a socket opening 706 to accommodate the bulbous protrusion on the associated rigid element. It will be readily understood that the flanges 704 of a number of such segments can be accommodated in a common groove to form a multi-socket guide in which a plurality of rigid elements can be accommodated.

The elements in FIGS. 26 and 27, as well as the rigid element in FIG. 25, can be fabricated of a plastic or a metal such as aluminum or steel or the like.

There will now be obvious to those skilled in the art many modifications and variations of the constructions and embodiments set forth hereinabove. These modifications and variations will not, however, depart from the scope of the invention if defined by the following claims.

What is claimed is:

1. Apparatus comprising a plurality of groups of interleaved strips having extended and withdrawn positions, the strips of each overlapping in louvre-like arrangement and, when concomitantly in extended positions, cooperatively exhibiting a display area constituted by exposed edge portions of the latter said strips, a continuously operating cam arrangement, and means between said cam arrangement and all of said groups of strips for cycling said groups, in overlapping sequence, between said extended and withdrawn positions, the cam arrangement including a cam element for each said group and said means comprising, for each cam element, a cam follower, a cross arm connected with said cam follower, and at least one elongated element attached to said cross arm and supporting the strips of one of said groups, the cam followers including two legs connected in inverted L-shaped relation, and a roller at the free extremity of one leg, the other leg being connected to the associated cross arm.

2. Apparatus as claimed in claim 1, wherein the cam followers are arranged in nesting relation.

3. A casette for a display device which comprises a display housing and a control mechanism adapted for selectively and sequentially inserting into and withdrawing from a display zone in said housing each of a plurality of exhibits collectively constituted by a plurality of interleaved sections, said casette comprising a support member, a plurality of strips adapted to constitute said interleaved sections and cooperatively bearing said plurality of exhibits, and connecting means detachably connecting the strips to said support member in relatively fixed relationship to one another such that said support member is adapted for conveying the strips to said housing whereafter said support member and strips are separated, said connecting means being positioned on said support for engagement with said control mechanism so that the strips can be selectively inserted into and withdrawn from said display zone by the control mechanism .

4. A casette as claimed in claim 3, wherein the strips are parallel strips arranged in spaced groups of superimposed strips of equal number.

5. A casette as claimed in claim 3, wherein said control mechanism includes a plurality of transport members displaceable along parallel paths and a driving means to displace the transport members relative to said display zone, said connecting means including elongated members connectible to said transport members, all of the strips constituting one of said exhibits being connected to a respective one of said elongated members.

6. A casette as claimed in claim 5 comprising at least one finger on each strip, the fingers on all strips of one exhibit being aligned with each other, the fingers of the strips of different exhibits being staggered whereby the strips of each exhibit can be connected to respective of said elongated members.

7. A casette as claimed in claim 6, wherein the elongated members are flat strips of a paperlike material arranged in coplanar and parallel alignment, said fingers also being flat strips of paperlike material each consisting of hinged sections one of which is connected to a respective one of the elongated members.

8. A casette as claimed in claim 7, wherein the said support member is a flat open frame to which the elongated members are detachably connected, the elongated members extending in stretched condition across said frame.

9. A casette as claimed in claim 8, wherein the elongated members are flexible and are adapted for being held in extended condition by said transport members.

10. Display apparatus comprising a display housing, a plurality of interleaved strips in said housing and connected in groups each constituting an exhibit, means supporting the strips in said housing such that the groups can be individually exposed and such that the strips can be replaced with a unit of substitute strips, drive means in said housing engaging the first said means for selectively exposing said groups, said drive means being displaceable between active and idle positions in which the first said means is respectively engaged with and disengaged from the drive means to facilitate replacement of the strips, the first said means being elongated rigid elements and said drive means including a plurality of cams and cam followers connected to the rigid elements and adapted to engage said cams, said cams being displaceable between said active and idle positions to control engagement with said cam followers, and means to bring the rigid elements into a position of alignment with each other when the cams are displaced to idle positions.

11. Apparatus for moving interleaved groups of strips selectively between withdrawn and extended positions, said apparatus comprising a plurality of rigid elements, guide means to guide said elements along parallel vertical paths, drive means to drive said rigid elements in staggered relation along said paths between upper and lower limits, and mounting means to suspend said strips from the rigid elements in hanging relation with the strips extending horizontally across said elements, said rigid elements being channel-like members and said mounting means including strip-like supports accommodated in said channel-like members and fingers connected to the supports and suspending said strips therefrom.

12. Apparatus as claimed in claim 11, wherein said channel-like members include cooperating sections which can be detached to provide for the insertion of said supports.

13. Apparatus as claimed in claim 11, wherein said supports are flexible members which are held in extended condition by said rigid elements.

14. Apparatus as claimed in claim 11, wherein the fingers attached to at least some adjacent pairs of said strips are connected on oppositely facing sides of such strips.

15. Apparatus as claimed in claim 11, wherein the supports and fingers are cardboard.

16. Apparatus as claimed in claim 12, wherein said channel-like members each include toed-in flanges one on each said section, said sections including engageable male and female parts to hold the sections together, one of said sections including a bulbous part by which the thusly constituted rigid element is slidably supported.

17. In an apparatus including a plurality of groups of strips arranged in overlapping relation and means to move the groups through one another to expose one group at a time for viewing; a plurality of strip carriers each comprising a support strip, a plurality of tabs on the support strip for engaging a respective one of the first said strips which is provided with corresponding openings, and a plurality of fingers extending at least substantially laterally from the support strip for the suspension and mounting of the latter.

18. A multiple picture display apparatus wherein each picture is fabricated from a number $n$ of reproductions thereof, said apparatus comprising a plurality of groups of strips in interleaved relation, each group representing one of said pictures, and means for selectively displacing the groups through and relative to each other for selective exposure, each said strip in a thusly exposed group including an exposed edge portion, the exposed edge portions having a common width $w$ and said strips having a common width W and wherein $W = w \times n$.

19. Apparatus as claimed in claim 18, wherein said means includes means to reciprocate each of said groups through a distance equal to about twice $w$.

20. Apparatus as claimed in claim 19 comprising fingers extending partly across and connected to said strips and suspending the strips horizontally in hanging relation, said fingers including bottom edges spaced from the bottom edges of the strips by an amount equal to about one hundred and twenty percent of $w$.

21. Apparatus as claimed in claim 20, wherein the fingers include corresponding hinges which are spaced from the corresponding strips by an amount equal to said distance plus about one inch.

22. Apparatus as claimed in claim 21, wherein the fingers of a total length equal to about .500 inch plus the second said amount plus W less the first said amount.

23. A casette for a display device which includes a plurality of parallel rigid members selectively displaceable along parallel paths, said casette comprising an open frame, parallel elongated members stretched across said frame and detachably connected thereto in positions corresponding to those of said rigid members to provide for attachment to the latter, and strips arranged transversely of said elongated members, said elongated members being adapted for transfer from said frame to said rigid members, said strips being arranged in a plurality of groups each bearing a respective exhibit.

24. Display apparatus comprising a plurality of display carrying means, driving means for driving the display carrying means between display and retracted positions in a sequencing operation during which at least one of the display carrying means is offset from the others, said display carrying means being adapted for being brought into mutually aligned positions, groups of strips, each group having thereon an exhibit portions of which are distributed among the strips of the corresponding group, connecting means connecting the strips of each group, and casette means carrying the connecting means with the groups of strips aligned for transfer to the display carrying means when the latter are in said mutually aligned positions, said casette means being detachable from the connecting means and groups of strips.

References Cited

UNITED STATES PATENTS

| 3,080,668 | 3/1963 | Reali | 40—36 |
| 3,283,429 | 11/1966 | Stutz | 40—65 |
| 3,373,517 | 3/1968 | Halperin | 40—65 |
| 3,421,240 | 1/1969 | Bardi | 40—65 |

FOREIGN PATENTS

| 993,114 | 7/1951 | France | 40—36 |

LAWRENCE CHARLES, Primary Examiner